(12) United States Patent
Umeda (10) Patent No.: US 11,595,546 B1
(45) Date of Patent: Feb. 28, 2023

(54) IMAGE FORMING APPARATUS, DETECTION METHOD, AND IMAGE FORMING SYSTEM FOR DETECTING WIRELESS TAG

(71) Applicant: TOSHIBA TEC KABUSHIKI KAISHA, Tokyo (JP)

(72) Inventor: Keita Umeda, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/681,608

(22) Filed: Feb. 25, 2022

(51) Int. Cl.
*H04N 1/32* (2006.01)
*H04N 1/00* (2006.01)
*H04N 1/327* (2006.01)

(52) U.S. Cl.
CPC ....... *H04N 1/32614* (2013.01); *H04N 1/0032* (2013.01); *H04N 1/0061* (2013.01); *H04N 1/00315* (2013.01); *H04N 1/00774* (2013.01); *H04N 1/00777* (2013.01); *H04N 1/327* (2013.01); *H04N 1/32704* (2013.01); *H04N 1/32706* (2013.01); *H04N 1/00339* (2013.01)

(58) Field of Classification Search
None
See application file for complete search history.

(56) References Cited

U.S. PATENT DOCUMENTS

2007/0139686 A1* 6/2007 Nishimi ............. G03G 21/1657
358/1.15

2020/0195796 A1 6/2020 Ishihara
2021/0300064 A1* 9/2021 Kitagawa .................. B41J 3/50
2021/0405941 A1* 12/2021 Takizawa .............. G06F 3/1282

FOREIGN PATENT DOCUMENTS

JP 2021126790 A * 9/2021

OTHER PUBLICATIONS

JP-2021126790-A English Translation, Yamada, Abstract, par 0040, 0051-0052, 0076 (Year: 2021).*

* cited by examiner

*Primary Examiner* — Miya J Williams
*Assistant Examiner* — Miya J Cato
(74) *Attorney, Agent, or Firm* — Foley & Lardner LLP (57) ABSTRACT

An image forming apparatus, detection method, and image forming system are provided. The apparatus includes a communication interface, a detector, and a notification interface. The communication interface communicates with a wireless tag at a connection position where a sheet conveyance path is formed between the apparatus and a retrofit device equipped with the wireless tag. The detector detects a connection state between the retrofit device and the apparatus based on a communication result of the communication interface. The notification interface provides a notification based on the connection state detected by the detector. The detection method includes detecting a connection state between the retrofit device and the apparatus based on a communication result of the communication interface, and providing a notification based on the connection state detected in the detection. The image forming system includes an apparatus and a retrofit device provided with a wireless tag.

20 Claims, 7 Drawing Sheets

IMAGE FORMING APPARATUS, DETECTION METHOD, AND IMAGE FORMING SYSTEM FOR DETECTING WIRELESS TAG

FIELD

Embodiments described herein relate generally to an image forming apparatus, a detection method, and an image forming system.

BACKGROUND

Image forming apparatuses such as printers and multifunction peripherals have been used in offices and the like. For example, in an office or the like that uses a large number of specific sheets, printing may be performed using a large-capacity sheet feed device that is retrofitted to the image forming apparatus. A retrofit device such as a large-capacity sheet feed device is attached to the image forming apparatus by using a dedicated sheet metal or the like. The retrofit device and the image forming apparatus are connected with accurate alignment so as to form a conveyance path for conveying the sheet between the retrofit device and the image forming apparatus.

DETAILED DESCRIPTION

In an imaging forming apparatus as described above, since a dedicated sheet metal is used, a connection failure may occur at the time of mounting or a connection failure may occur due to aged deterioration, and a conveyance path near the connection portion between the two may not be properly formed and sheet conveyance failures such as jamming may occur.

Disclosed herein is an image forming apparatus that includes a communication interface, a detector, and a notification interface. The communication interface communicates with a wireless tag at a connection position where a sheet conveyance path is formed between the image forming apparatus and a retrofit device provided with the wireless tag. The detector detects a connection state between the retrofit device and the image forming apparatus based on a communication result of the communication interface. The notification interface provides a notification based on the connection state detected by the detector.

Figure 1:
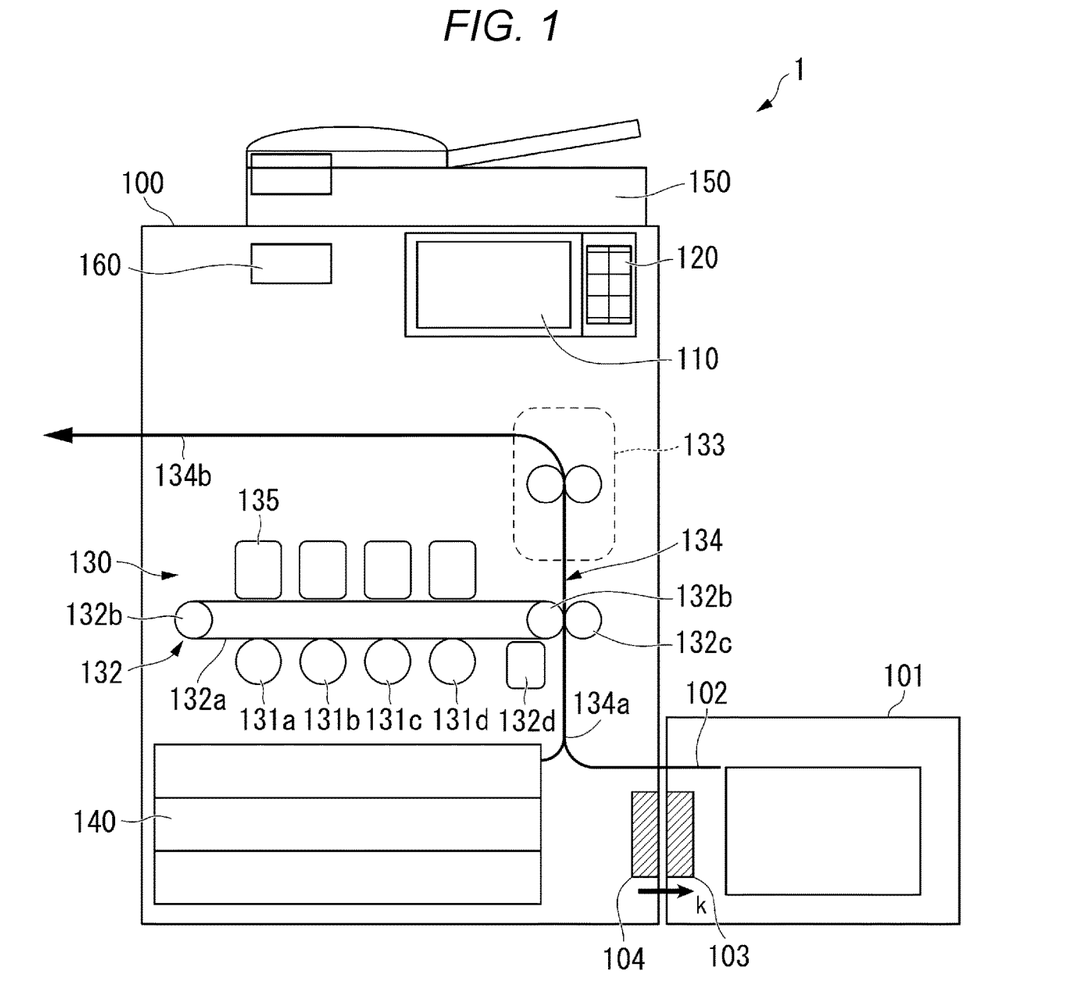
FIG. 1 is an explanatory diagram showing an example of an image forming system 1 of an embodiment.

FIG. 1 is an explanatory diagram showing an example of an image forming system 1 of an embodiment. As shown in FIG. 1, the image forming system 1 includes an image forming apparatus 100 and a large-capacity sheet feed device 101. First, the image forming apparatus 100 will be described. The image forming apparatus 100 is, for example, a multifunction peripheral. The image forming apparatus 100 includes a display 110, a control panel 120, a printer 130, a sheet storage unit 140, and an image reading unit 150.

The display 110 is, for example, a touch panel type liquid crystal display. The display 110 displays various information. Further, the display 110 accepts an operation from a user.

The control panel 120 includes various operation keys such as a numeric keypad and a start key. The control panel 120 receives various input operations from the user. For example, the control panel 120 accepts an input operation related to sheet feeding. The input operation related to sheet feeding is, for example, an input operation such as selecting a sheet to be used for printing from the sheets stored in the large-capacity sheet feed device 101 or the sheet storage unit 140. The control panel 120 outputs operation signals corresponding to various input operations received from the user to a control unit.

The printer 130 performs a series of printing operations using various information output from the display 110, the control panel 120, the image reading unit 150, and the like. The series of printing operations includes an operation of inputting image information, an operation of forming an image, an operation of transferring the formed image to a sheet, an operation of conveying the sheet, and the like.

The sheet storage unit 140 includes a plurality of sheet cassettes. Each sheet cassette stores sheets. The sheet is mainly ordinary copy paper, but also includes a photographic sheet, a label sheet, a polyester film sheet, and the like.

The image reading unit 150 includes an automatic document feeding device and a scanner device. The automatic document feeding device sends out the documents placed on a document tray to the scanner device. The scanner device optically scans the document on a document glass table and forms an image of the reflected light from the document on a light receiving surface of a Charge Coupled Device (CCD) sensor. As a result, the scanner device reads the document image on the document glass table. The image reading unit 150 generates image information (image data) using the reading result read by the scanner device.

Next, the internal configuration of the printer 130 will be described. The printer 130 includes four image forming units 131a, 131b, 131c, and 131d in parallel. The printer 130 is a so-called quadruple tandem type. The printer 130 includes an image processing unit (not shown), image forming units 131 (131a, 131b, 131c, and 131d), an intermediate transfer unit 132, a fixing unit 133, and a sheet conveyance unit 134.

The image processing unit inputs image information. The image information to be input is the image information generated by the image reading unit 150 or the image information transmitted from other devices. The image processing unit performs digital image processing for processing the input image information according to the initial setting or the user's setting. For example, the digital image processing includes gradation correction based on gradation correction data. In addition to the gradation correction, the digital image processing includes various correction processing such as color correction and shading correction, and compression processing for the image data.

The image forming unit 131 includes an image forming unit 131a corresponding to yellow (Y), an image forming unit 131b corresponding to magenta (M), an image forming unit 131c corresponding to cyan (C), and an image forming unit 131d corresponding to black (K). Each of the image forming units 131a, 131b, 131c, and 131d includes a photoconductor drum, a charger, an exposure device, a developing device, a drum cleaning device, and the like.

The photoconductor drum is, for example, a charged organic photo-conductor (OPC) in which an undercoat layer, a charge generation layer, and a charge transport layer are sequentially stacked on the peripheral surface of a conductive cylinder made of aluminum. The photoconductor drum has photoconductivity.

The charger generates a corona discharge. The charger uniformly charges the surface of the photoconductor drum.

The exposure device is, for example, a semiconductor laser. The exposure device irradiates the photoconductor drum with a laser beam corresponding to an image of each color component. If the laser beam is irradiated by the exposure device, the potential of the region irradiated with the laser beam in the region of the surface of the photoconductor drum changes. Due to this change in potential (e.g., a potential difference), an electrostatic latent image is formed on the surface of the photoconductor drum.

The developing device stores the developer. The developing device adheres the toner of each color component to the surface of the photoconductor drum. As a result, a toner image is formed on the photoconductor drum. That is, the electrostatic latent image formed on the surface of the photoconductor drum is visualized.

Here, the developer will be described. As the developer, for example, a two-component developer is used. The two-component developer includes a non-magnetic toner and a carrier. For the carrier, for example, iron powder having a particle size of several tens of μm or polymer ferrite particles are used. The carrier is mixed with the toner in the developing device and triboelectrically charged to give the toner a charge (for example, a negative charge). Further, the carrier conveys the toner to the electrostatic latent image portion by the magnetic force. The toner is supplied from a toner cartridge 135 corresponding to each of Y, M, C, and K.

Further, the drum cleaning device is provided with a cleaning blade in contact with the surface of the photoconductor drum. The cleaning blade removes residual toner remaining on the surface of the photoconductor drum after the primary transfer. The removed residual toner is collected in the accommodating unit of the drum cleaning device.

Next, the intermediate transfer unit 132 will be described. The intermediate transfer unit 132 includes an intermediate transfer body 132a, a primary transfer roller arranged to face the photoconductor drum, a plurality of support rollers 132b, a secondary transfer roller 132c, a belt cleaning device 132d, and the like.

The intermediate transfer body 132a is, for example, an endless belt (e.g., a transfer belt). The intermediate transfer body 132a is a belt that does not have conductivity and elasticity. Specifically, for example, the intermediate transfer body 132a is a belt made of polyimide. However, the intermediate transfer body 132a may have conductivity and elasticity.

Support rollers 132b support the intermediate transfer body 132a so that tension is applied to the intermediate transfer body 132a. As a result, the intermediate transfer body 132a is formed in a loop shape. One roller among the plurality of support rollers 132b is a drive roller. The rollers other than the drive roller are driven rollers. As the drive roller drives and rotates, the intermediate transfer body 132a travels in a predetermined direction at a predetermined speed and in a predetermined cycle.

Here, the direction in which the intermediate transfer body 132a moves can be defined as an upstream direction and a downstream direction. Specifically, the direction in which the intermediate transfer body 132a moves can be defined with the image forming unit 131a as the most upstream and the belt cleaning device (cleaner) 132d as the most downstream.

The primary transfer roller is arranged to face the photoconductor drum across the intermediate transfer body 132a. Specifically, the primary transfer roller is arranged so as to put pressure against the photoconductor drum with the intermediate transfer body 132a interposed therebetween. As a result, the primary transfer roller and the photoconductor drum form a primary transfer unit for nipping the intermediate transfer body 132a.

If the intermediate transfer body 132a passes through this primary transfer unit, the toner image formed on the photoconductor drum is transferred onto the intermediate transfer body 132a. If the intermediate transfer body 132a passes through the primary transfer unit, a primary transfer bias is applied to the primary transfer roller. Specifically, for example, a charge having the opposite polarity (positive polarity) to the toner is applied to the primary transfer roller. As a result, the toner image formed on the photoconductor drum is electrostatically transferred to the intermediate transfer body 132a.

The secondary transfer roller 132c is arranged to face one of the support rollers 132b across the intermediate transfer body 132a. Specifically, the secondary transfer roller 132c is arranged so that pressure is applied to the one of the support rollers 132b with the intermediate transfer body 132a interposed therebetween. As a result, the secondary transfer roller 132c and the one of the support rollers 132b form a secondary transfer unit for nipping the intermediate transfer body 132a and the sheet.

If the sheet passes through the secondary transfer roller 132c, the toner image formed on the intermediate transfer body 132a is transferred onto the sheet. If the sheet passes through the secondary transfer roller 132c, a secondary transfer bias is applied to the one of the support rollers 132b. Specifically, the same polarity (negative polarity) as the toner is applied to the one of the support rollers 132b. As a result, the toner image on the intermediate transfer body 132a is electrostatically transferred to the sheet.

The secondary transfer roller 132c and the support roller 132b can be separated from each other. Thereby, if the sheet is jammed in the secondary transfer unit, the user can remove the sheet.

The belt cleaning device 132d includes a cleaning blade in contact with the surface of the intermediate transfer body 132a. The cleaning blade removes residual toner remaining on the surface of the intermediate transfer body 132a after the secondary transfer. The removed residual toner is collected in the accommodating unit of the belt cleaning device 132d.

The fixing unit 133 heats and pressurizes the sheet on which the toner image is transferred. The fixing unit is, for example, a roller type including a heating roller for heating the sheet and a pressure roller for pressure-contacting the heating roller. As a result, the fixing unit 133 fixes the toner image on the sheet. A method of fixing the toner image to the sheet by heating via a film-like member can also be applied to the fixing unit 133.

Next, the sheet conveyance unit 134 will be described. The sheet conveyance unit 134 includes a sheet feed unit 134a and a sheet discharge unit 134b. The sheet feed unit 134a conveys the sheets stored in the sheet storage unit 140 or the large-capacity sheet feed device 101 one by one to a resist unit (not shown). The resist unit stops the sheet conveyed from the sheet feed unit 134a and sends out the sheet to the secondary transfer roller 132c at a predetermined timing. The predetermined timing is the timing at which the toner image formed on the intermediate transfer body 132a is secondarily transferred by the secondary transfer roller 132c.

The secondary transfer roller 132c transfers the toner image to the sheet sent from the resist unit. Further, the secondary transfer roller 132c sends out the sheet onto which the toner image is transferred toward the fixing unit 133. The fixing unit 133 heats and pressurizes the sheet sent out from the secondary transfer roller 132c and sends out the sheet to the sheet discharge unit 134b. The sheet discharge unit 134b discharges the sheet onto the sheet discharge tray.

Next, the large-capacity sheet feed device 101 will be described. The large-capacity sheet feed device 101 is an example of a retrofit device. For example, there are users who print using a specific sheet in large quantities (for example, 1000 or more). In order to meet such a user's expectations, the image forming apparatus 100 may be retrofitted with a large-capacity sheet feed device 101 at a manufacturing stage or a user's use stage. The large-capacity sheet feed device 101 stores a large number of sheets. The large-capacity sheet feed device 101 is placed and connected to the side of the image forming apparatus 100. A connection conveyance path 102 for conveying sheets is formed at a connection portion connecting the large-capacity sheet feed device 101 and the image forming apparatus 100. The connection portion is accurately aligned and connects the two so as not to cause a sheet conveyance failure such as jamming.

Further, in the large-capacity sheet feed device 101, a near field wireless tag 103 is disposed at a predetermined position on the image forming apparatus 100 side. The near field wireless tag 103 is a wireless tag that performs near field wireless communication of about several centimeters, and is, for example, a Near Field Communication (NFC) tag or a TransferJet (registered trademark) tag.

Further, in the image forming apparatus 100, a near field wireless module 104 is disposed at a predetermined position on the large-capacity sheet feed device 101 side. The predetermined position is at least a position that does not give noise to the image formation due to the radio wave emitted by the near field wireless module 104. The near field wireless module 104 transmits radio waves in the direction of arrow k, for example. The near field wireless module 104 includes an antenna and communicates with the near field wireless tag 103. Specifically, the near field wireless module 104 performs handshake communication with the near field wireless tag 103 to establish communication. The handshake communication is, for example, a 3-way handshake communication.

More specifically, the near field wireless module 104 transmits an SYN packet (e.g., a connection request) to the near field wireless tag 103. Upon receiving the SYN packet, the near field wireless tag 103 transmits an SYN ACK packet (e.g., an ACK number is a confirmation response) allowing the connection of the near field wireless module 104 to the near field wireless module 104. Upon receiving the SYN ACK packet, the near field wireless module 104 transmits an ACK packet (e.g., a positive response) indicating the start of the connection to the near field wireless tag 103. As a result, communication between the near field wireless module 104 and the near field wireless tag 103 is established.

In the handshake communication, the near field wireless module 104 handles only the information related to the establishment of the handshake communication with the near field wireless tag 103. In other words, the near field wireless module 104 does not exchange information other than the information related to the establishment of handshake communication with the near field wireless tag 103. As a result, communication can be established with a simple configuration and the processing load related to the establishment of communication can be reduced.

Here, the connection between the image forming apparatus 100 and the large-capacity sheet feed device 101 may be disconnected. If this disconnection occurs, a sheet conveyance failure such as jamming will occur and it will not be possible to efficiently convey the sheet. Therefore, if the communication range between the near field wireless module 104 and the near field wireless tag 103 is wider than necessary, communication will be established even though the connection with the large-capacity sheet feed device 101 is misaligned.

Therefore, in the present embodiment, the near field wireless module 104 and the near field wireless tag 103 are arranged so that communication can be established only at a position where the near field wireless module 104 and the near field wireless tag 103 face each other (e.g., an appropriate position). Specifically, for example, it is desirable that the antenna of the near field wireless module 104 be a directional antenna having good sensitivity only in a certain direction. Further, it is desirable that the communication distance be set so that the near field wireless module 104 and the near field wireless tag 103 can communicate only at the opposite positions.

Next, a state if the large-capacity sheet feed device 101 is connected to the image forming apparatus 100 will be described with reference to FIG. 2.

Figure 2:
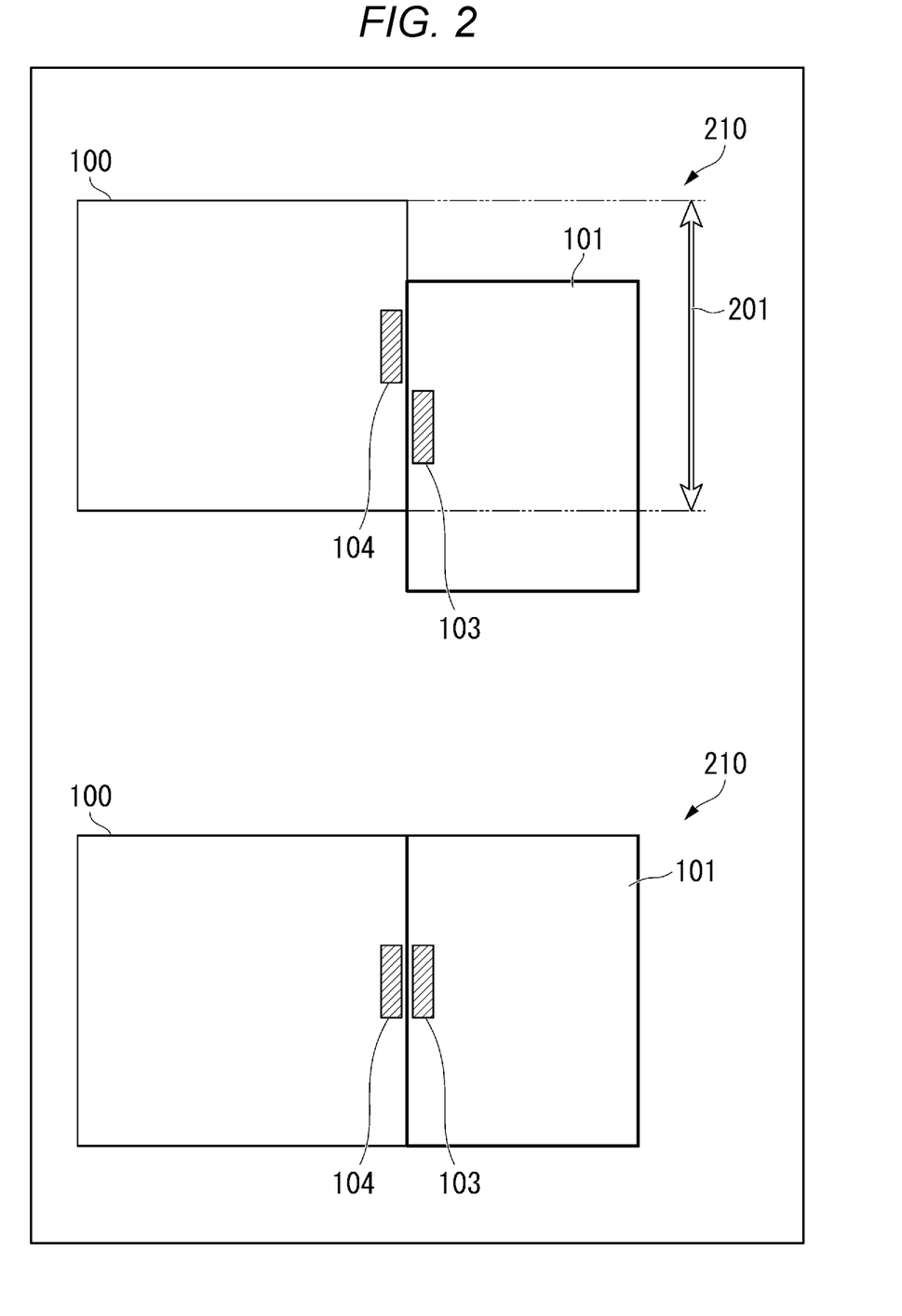
FIG. 2 is a top view showing a state if a large-capacity sheet feed device 101 is connected to an image forming apparatus 100.

FIG. 2 is a top view showing a state if the large-capacity sheet feed device 101 is connected to the image forming apparatus 100. In FIG. 2, a non-connection position 200 indicates that the image forming apparatus 100 and the large-capacity sheet feed device 101 are not connected. That is, at the non-connection position 200, communication between the near field wireless tag 103 and the near field wireless module 104 is not established.

Here, if the image forming apparatus 100 and the large-capacity sheet feed device 101 are connected by using a dedicated sheet metal, there is a possibility that a connection failure may occur at the time of mounting and there is a possibility that a connection failure may occur due to aged deterioration. Further, if a dedicated sheet metal is used, it may not be possible to easily return to the connection position 210 because of a connection failure.

On the other hand, in the present embodiment, since the alignment is performed by communication with the near field wireless tag 103, the alignment can be performed easily and with high accuracy without using a dedicated sheet metal. For example, when installing the large-capacity sheet feed device 101, the operator moves the large-capacity sheet feed device 101 to the connection position 210. If the large-capacity sheet feed device 101 is disposed at the connection position 210, the near field wireless tag 103 and the near field wireless module 104 are disposed at positions facing each other. As a result, communication between the near field wireless tag 103 and the near field wireless module 104 is established. At the connection position 210, the large-capacity sheet feed device 101 is installed in a fixed manner. Therefore, it is possible to reduce a connection failure when installing the large-capacity sheet feed device 101. Further, even if a connection failure occurs in the large-capacity sheet feed device 101 due to aged use or the like, the operator can easily dispose the large-capacity sheet feed device 101 at the connection position 210.

Next, an example of the hardware configuration of the image forming system 1 will be described with reference to FIG. 3.

Figure 3:
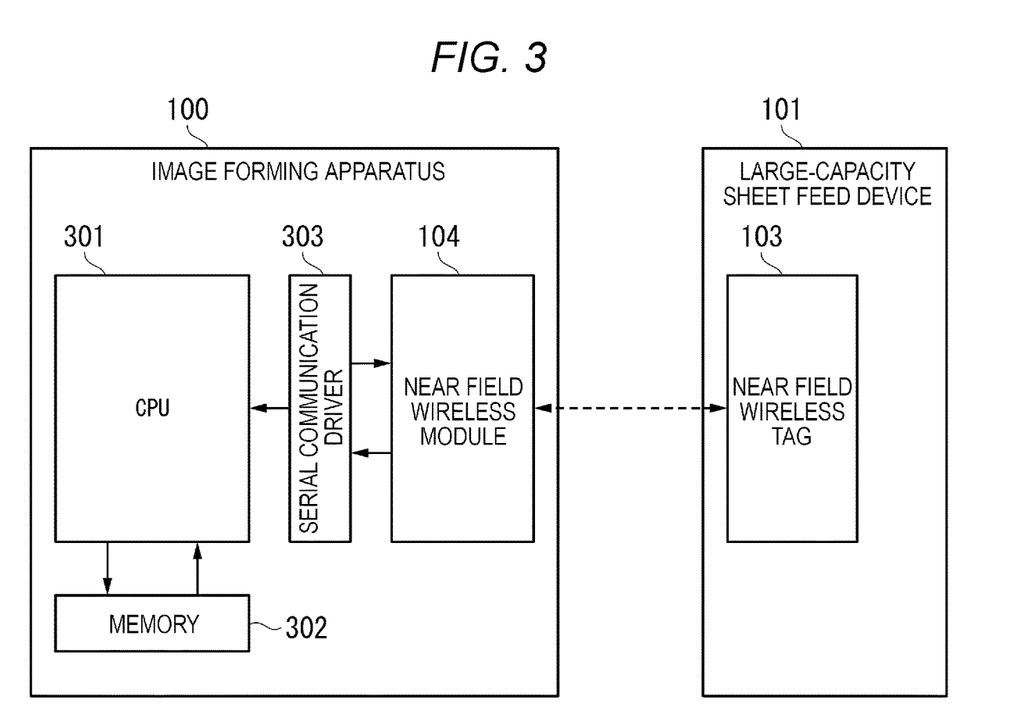
FIG. 3 is an explanatory diagram showing an example of the hardware configuration of the image forming system 1.

FIG. 3 is an explanatory diagram showing an example of the hardware configuration of the image forming system 1. In FIG. 3, in addition to the above-described configuration, the image forming apparatus 100 includes a Central Processing Unit (CPU) 301, a memory 302, and a serial communication driver 303.

The CPU 301 is a central processing unit and controls each part shown in FIG. 3 by reading and executing various programs stored in the memory 302. Various programs include a detection program according to the present embodiment.

The memory is a read-only memory (ROM), a random-access memory (RAM), a hard disk, and the like. The ROM is a read-only memory and stores various information used by the CPU, including a program. The RAM is a memory that can be read and written, and stores various information. For example, the RAM stores information acquired from the outside, information received from the user, and information generated in various processes. The hard disk stores various information.

The serial communication driver 303 is a driver for making the near field wireless module 104 function as a device.

Next, the functional configuration of the image forming apparatus 100 will be described with reference to FIG. 4.

Figure 4:
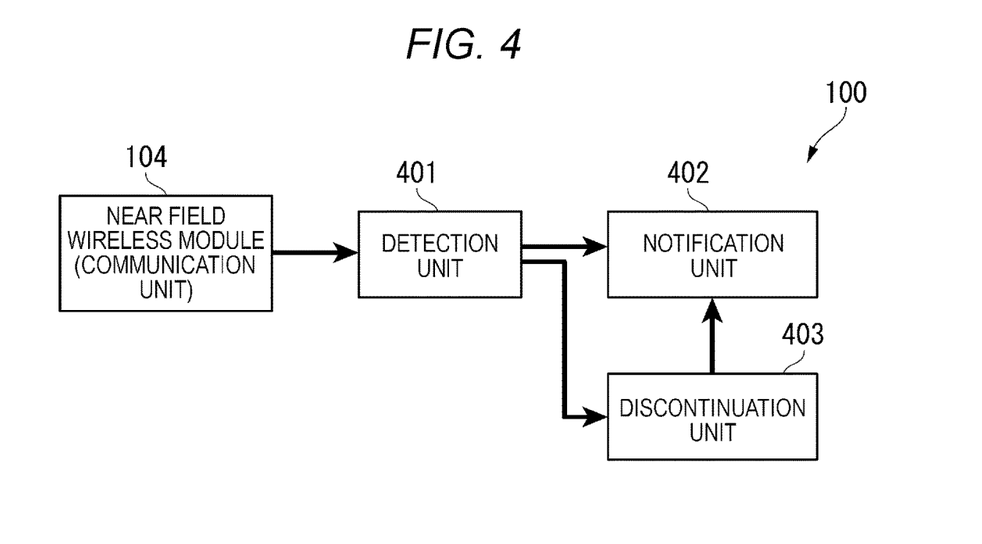
FIG. 4 is an explanatory diagram showing an example of the functional configuration of the image forming apparatus 100.

FIG. 4 is an explanatory diagram showing an example of the functional configuration of the image forming apparatus 100. In FIG. 4, the image forming apparatus 100 includes the near field wireless module 104, a detection unit 401 (e.g., a detector), a notification unit 402 (e.g., a notification interface), and a discontinuation unit 403 (e.g., a processor). The near field wireless module 104 is an example of a communication unit (e.g., a communication interface). The detection unit 401, the notification unit 402, and the discontinuation unit 403 are implemented by the CPU 301. That is, the CPU 301 realizes the functions of the respective units 401, 402, and 403 by executing the detection program stored in the memory.

The present disclosure is not limited to performing the processing according to the present embodiment by the CPU 301 executing the program. For example, hardware (e.g., a circuit unit, including circuitry) such as Large Scale Integration (LSI), Application Specific Integrated Circuit (ASIC), Field-Programmable Gate Array (FPGA), and Graphics Processing Unit (GPU) can be used to perform the processing according to the present embodiment, and it is also possible to perform the processing according to the present embodiment by the cooperation of the software and the hardware.

The detection unit 401 detects the connection state between the large-capacity sheet feed device 101 and the image forming apparatus based on the communication result of the near field wireless module 104. The communication result is a result showing a communication state with the near field wireless tag 103, and specifically, is a result of whether or not communication with the near field wireless tag 103 is established. The detection unit 401 detects a connection state indicating non-connection if a communication result for which the communication was not established is obtained by the near field wireless module 104. On the other hand, the detection unit 401 detects a connection state indicating connection if a communication result for which the communication was established is obtained by the near field wireless module 104.

The notification unit 402 is an audiovisual communication interface (a notification interface) that makes a notification based on the connection state detected by the detection unit 401. The notification is a notification by display using the display 110 or a notification by sound using a speaker (not shown). Specifically, if the detection unit 401 detects a connection state indicating non-connection, the notification unit 402 gives a notification indicating a connection failure (see, for example, the mark image 702b of FIG. 7). On the other hand, if the detection unit 401 detects the connection state indicating connection, the notification unit 402 displays the normal screen without particularly notifying that the device is located at the connection position. However, if the detection unit 401 detects the connection state indicating connection, the notification unit 402 may notify that the device is located at the connection position. The notification of being at the connection position may be, for example, a display of characters, marks, or the like.

Here, it is assumed that the near field wireless module 104 and the near field wireless tag 103 are temporarily disconnected due to communication failure, noise, or the like. If a notification of the connection failure is made despite the temporary disconnection of communication, it means that a notification of the connection failure is made even though there is no abnormality in the connection conveyance path 102. Therefore, the notification unit 402 may not notify the connection failure if the detection unit 401 did not detect the connection state indicating non-connection for a predetermined time or longer.

However, in the present embodiment, the notification unit 402 notifies the connection failure if the detection unit 401 detects the connection state indicating non-connection for a predetermined time or longer. In this case, the notification of the connection failure is, for example, a notification urging the re-installation of the large-capacity sheet feed device 101 (see, for example, the prompt screen 800 of FIG. 8). That is, in the present embodiment, the notification of the connection failure is a notification in a different mode depending on whether or not the connection state indicating non-connection is continuously detected for a predetermined time or longer.

If the detection unit 401 detects a connection state indicating non-connection, the discontinuation unit 403 discontinues the use of the large-capacity sheet feed device 101. For example, even if the communication is temporarily disconnected due to the communication failure, noise, or the like, the discontinuation unit 403 discontinues the use as long as the connection state indicating non-connection is detected. However, in the case of communication failure, noise, or the like, although the connection state indicating temporary disconnection is detected, the connection state indicating connection will be immediately detected. Therefore, even if noise or the like occurs, the discontinuation unit 403 immediately cancels the discontinuation of use. Even if the use of the large-capacity sheet feed device 101 is discontinued by the discontinuation unit 403, it is possible to use the sheet stored in the sheet storage unit 140, that is, it is possible to perform printing.

Figure 7:
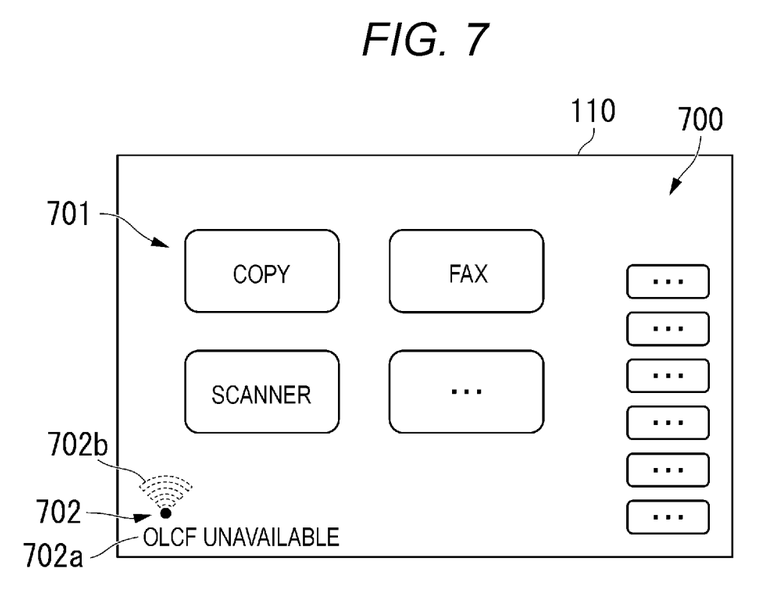
FIG. 7 is an explanatory diagram showing an example of a connection failure screen displayed on a display 110 in the case of discontinuation of use and connection failure.

Further, if the use of the large-capacity sheet feed device 101 is discontinued by the discontinuation unit 403, the notification unit 402 gives a notification to that fact (see, for example, the character image 702a of FIG. 7). The notification is, for example, a display on the display 110. Since communication may be temporarily disconnected due to the communication failure or noise, the notification does not have to be a notification mode to aggressively make the user recognize the fact.

Further, if a connection state indicating non-connection is detected for a predetermined time or longer, the operator such as a user or a work staff performs the work of moving the device from the non-connection position to the connection position. In this work, the operator moves the large-capacity sheet feed device 101 to be positioned at an appropriate position (connection position). Therefore, even if the large-capacity sheet feed device 101 is positioned at the connection position, it may be difficult for the operator to grasp whether or not the large-capacity sheet feed device 101 is at the connection position. In particular, since the operator is performing the work, it may be difficult to check the display 110.

Therefore, in the present embodiment, if the detection unit 401 detects that the position changed from the non-connection position to the connection position, the notification unit 402 notifies by the sound that the device is located at the connection position. The sound indicating that the device is located at the connection position may be a voice indicating that, a predetermined buzzer sound, or the like.

Next, the flow of processing related to handshake communication in the image forming system 1 will be described with reference to FIG. 5.

Figure 5:
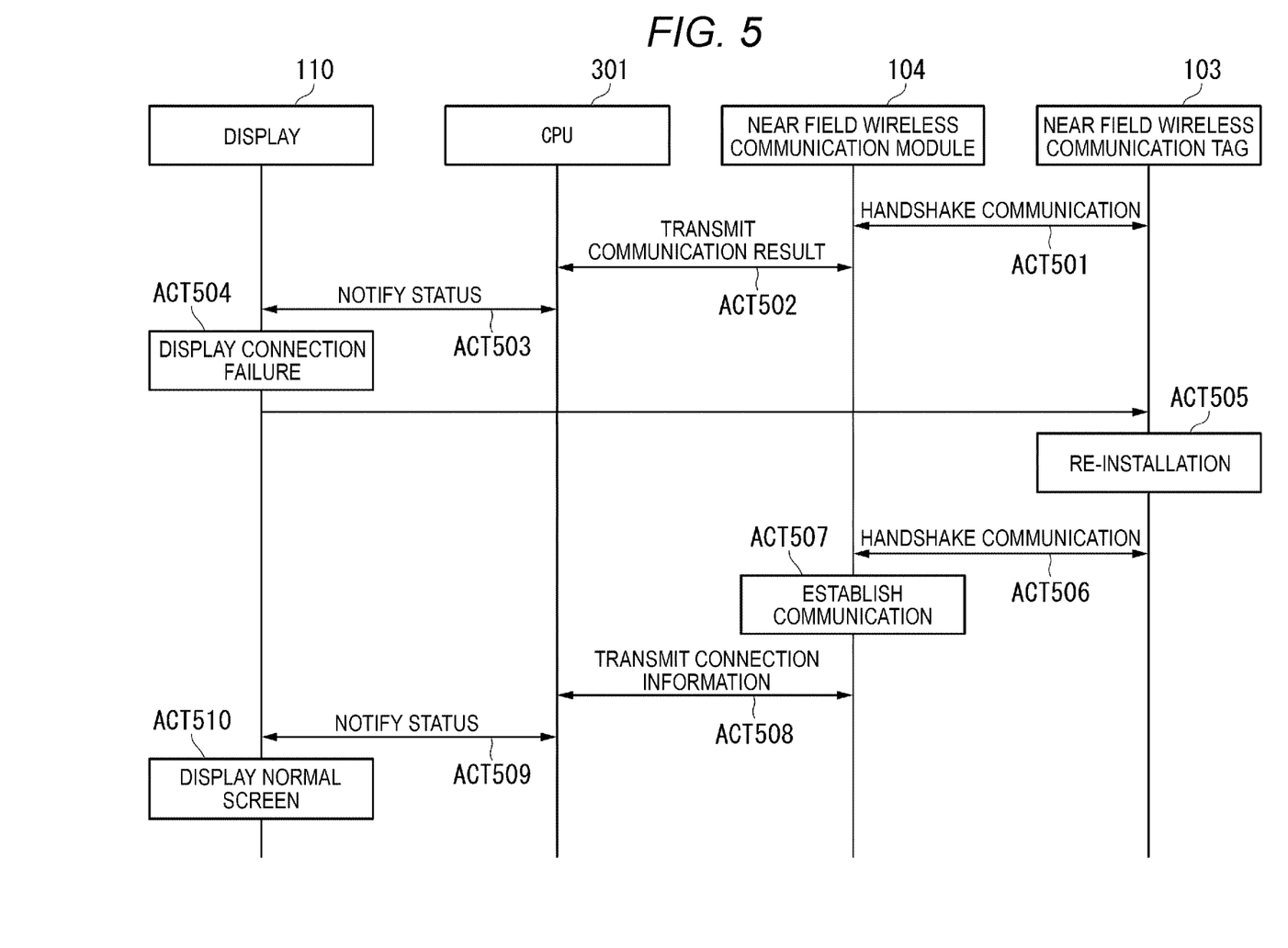
FIG. 5 is a sequence diagram showing a flow of processing related to handshake communication in the image forming system 1.

FIG. 5 is a sequence diagram showing a flow of processing related to handshake communication in the image forming system 1. In FIG. 5, first, the near field wireless module 104 and the near field wireless tag 103 attempt handshake communication (ACT 501). Then, the near field wireless module 104 sends the communication result of the handshake communication to the CPU 301 (ACT 502).

The CPU 301 causes the display 110 to notify the status (ACT 503). If the large-capacity sheet feed device 101 is at a non-connection position, the display 110 displays a connection failure (ACT 504). In response to this, the operator such as a user or a work staff re-installs the large-capacity sheet feed device 101 (ACT 505). The near field wireless module 104 constantly attempts handshake communication with the near field wireless tag 103 (ACT 506). Then, if the communication is established (ACT 507), the near field wireless module 104 sends connection information indicating that the handshake communication was established to the CPU 301 (ACT 508).

The CPU 301 causes the display 110 to notify the status (ACT 509). If the large-capacity sheet feed device 101 is at a connection position, the display 110 displays a normal screen (ACT 510).

Next, the connection state detection processing performed by the image forming apparatus 100 will be described with reference to FIG. 6.

Figure 6:
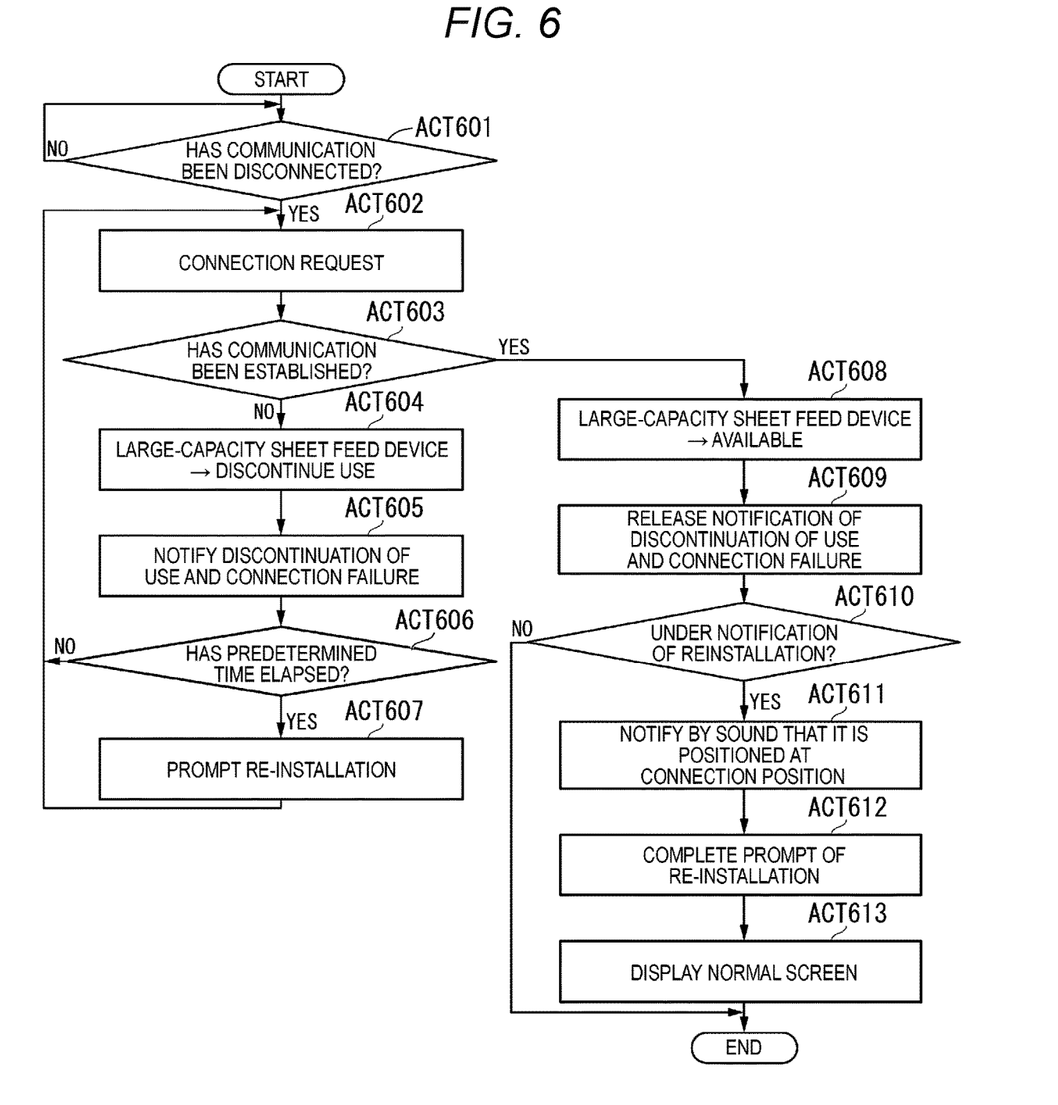
FIG. 6 is a flowchart showing an example of the connection state detection processing performed by the image forming apparatus 100.

FIG. 6 is a flowchart showing an example of the connection state detection processing performed by the image forming apparatus 100. In FIG. 6, the image forming apparatus 100 determines whether or not the communication between the near field wireless module 104 and the near field wireless tag 103 is disconnected (ACT 601). The image forming apparatus 100 waits until the communication is disconnected (ACT 601: NO), and if the communication is disconnected (ACT 601: YES), the image forming apparatus 100 requests the near field wireless tag 103 to connect the handshake communication (ACT 602).

Then, the image forming apparatus 100 determines whether or not communication was established (ACT 603). If communication is not established (ACT 603: NO), the image forming apparatus 100 discontinues the use of the large-capacity sheet feed device 101 (ACT 604). Then, the image forming apparatus 100 notifies the display 110 of the discontinuation of use of the large-capacity sheet feed device 101 and the connection failure (ACT 605). An example of the notification will be described later with reference to FIG. 7. Next, the image forming apparatus 100 determines whether or not a predetermined time elapsed (ACT 606).

If the predetermined time did not elapse (ACT 606: NO), the image forming apparatus 100 returns to ACT 602. If the predetermined time elapsed (ACT 606: YES), the image forming apparatus 100 gives a notification urging the re-installation of the large-capacity sheet feed device 101 (ACT 607) and returns to ACT 602. An example of the notification will be described later with reference to FIG. 8.

If communication is established in ACT 603 (ACT 603: YES), the image forming apparatus 100 can use the large-capacity sheet feed device 101 (ACT 608). Then, the image forming apparatus 100 cancels the notification of the discontinuation of use of the large-capacity sheet feed device 101 and the connection failure being displayed on the display 110 (ACT 609).

Next, the image forming apparatus 100 determines whether or not the re-installation is being notified (ACT 610). If the re-installation is not being notified (ACT 610: NO), the image forming apparatus 100 ends a series of processes. On the other hand, if the re-installation is being notified (ACT 610: YES), the image forming apparatus 100 notifies by the sound that the device is located at the connection position (ACT 611). Then, the image forming apparatus 100 ends the notification urging the re-installation (ACT 612), displays the normal screen (ACT 613), and ends a series of processes.

Next, a screen displayed on the display 110 of the image forming apparatus 100 will be described with reference to FIGS. 7 and 8.

FIG. 7 is an explanatory diagram showing an example of a connection failure screen displayed on the display 110 in the case of discontinuation of use and connection failure. In FIG. 7, a connection failure screen 700 shows a standby screen and includes various setting buttons 701. The various setting buttons 701 are buttons for accepting selections such as copy, fax, and scanner selections, and the like.

As shown on the connection failure screen 700, if the communication with the near field wireless tag 103 is disconnected, a discontinuation-of-use image 702 is displayed. The discontinuation-of-use image 702 includes a character image 702a and a mark image 702b. The character image 702a indicates that the large-capacity sheet feed device 101 (OLCF) cannot be used.

The mark image 702b is a mark indicating the radio wave strength with the near field wireless tag 103. In the illustration, it is assumed that the mark indicating the radio wave strength is turned off in the mark image 702b. That is, it indicates that the large-capacity sheet feed device 101 is at a non-connection position. The discontinuation-of-use image 702 may include at least one of the character image 702a and the mark image 702b. If the connection failure is resolved, the discontinuation-of-use image 702 is hidden, that is, the screen transitions to the normal screen.

Figure 8:
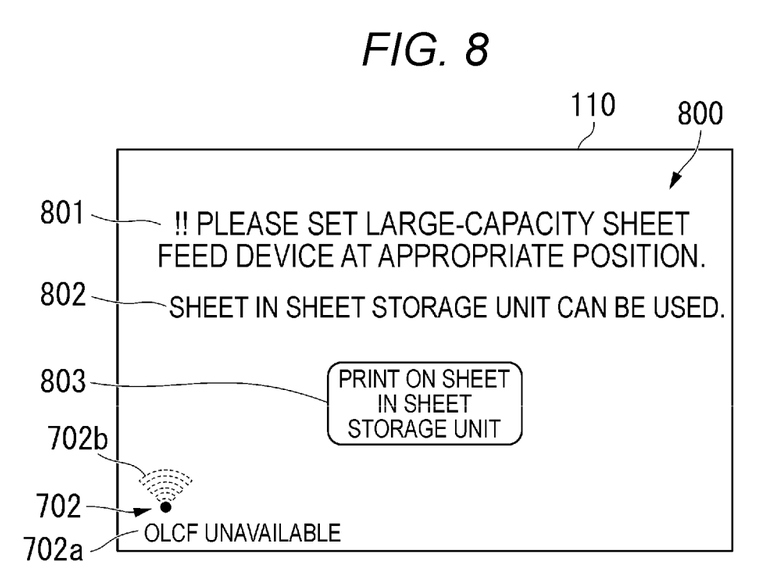
FIG. 8 is an explanatory diagram showing an example of a prompt screen displayed on the display 110 if re-installation is urged.

FIG. 8 is an explanatory diagram showing an example of a prompt screen displayed on the display 110 if re-installation is urged. In FIG. 8, the prompt screen 800 includes a re-installation notification 801 that urges the re-installation of the large-capacity sheet feed device 101, a notification of being available 802 that the sheet in the sheet storage unit 140 can be used, and a confirmation button 803. If the operator disposes the large-capacity sheet feed device 101 at an appropriate position, the prompt screen 800 transitions to the normal screen. Further, if the confirmation button 803 is pressed on the prompt screen 800, the screen transitions to a screen for accepting an operation related to printing using the sheet in the sheet storage unit 140. However, the re-installation notification 801 is continuously performed even on the transitioned screen. In the transitioned screen, the display mode of the re-installation notification 801 may be reduced or displayed as a mark in the corner of the display 110 to notify that the re-installation is urged.

As described above, the image forming apparatus 100 according to the present embodiment detects the connection state with the large-capacity sheet feed device 101 based on the communication result with the near field wireless tag 103 and gives a notification based on the connection state. As a result, the user can be made to recognize whether the large-capacity sheet feed device 101 is at the connection position or the non-connection position and can use the large-capacity sheet feed device 101. Therefore, it is possible to prevent a sheet conveyance failure in the connection conveyance path 102 from occurring. Further, since the alignment of the image forming apparatus 100 and the large-capacity sheet feed device 101 can be easily and accurately performed, the operator can dispose the large-capacity sheet feed device 101 at the connection position without using a dedicated sheet metal or the like.

Further, if the image forming apparatus 100 according to the present embodiment detects a connection state indicating non-connection, a connection failure is notified. As a result, if the device is at the non-connection position, the user can be urged not to use the large-capacity sheet feed device 101, and thus, it is possible to prevent a sheet conveyance failure in the connection conveyance path 102 in advance.

Further, the image forming apparatus 100 according to the present embodiment notifies the connection failure if the connection state indicating non-connection is detected for a predetermined time or longer. Specifically, if the image forming apparatus 100 detects the connection state indicating non-connection for a predetermined time or longer, the image forming apparatus 100 gives a notification urging the re-installation of the large-capacity sheet feed device 101. As a result, even if the communication between the near field wireless module 104 and the near field wireless tag 103 is temporarily disconnected due to the communication failure, noise, or the like, it is possible not to notify of the connection failure. Further, if a connection state indicating non-connection is detected for a predetermined time or longer, a notification different from the notification before the predetermined time elapsed can be given, and thus, the notification of the connection failure can be a stepwise notification.

Further, the image forming apparatus 100 according to the present embodiment communicates with the near field wireless tag 103 by handshake communication. As a result, communication can be established with a simple configuration and the processing load related to the establishment of communication can be reduced. Therefore, with a simple configuration, it is possible to detect a connection state indicating connection and a connection state indicating non-connection.

Further, if the image forming apparatus 100 according to the present embodiment detects a connection state indicating non-connection, the use of the large-capacity sheet feed device 101 is discontinued. This makes it possible to prevent the use of the large-capacity sheet feed device 101 at the non-connection position. Therefore, it is possible to prevent a sheet conveyance failure in the connection conveyance path 102 in advance.

Further, the image forming apparatus 100 according to the present embodiment is configured to notify the discontinuation of use if the use of the large-capacity sheet feed device 101 is discontinued. This makes it possible for the user to recognize that the use of the large-capacity sheet feed device 101 was discontinued.

Figure 9:
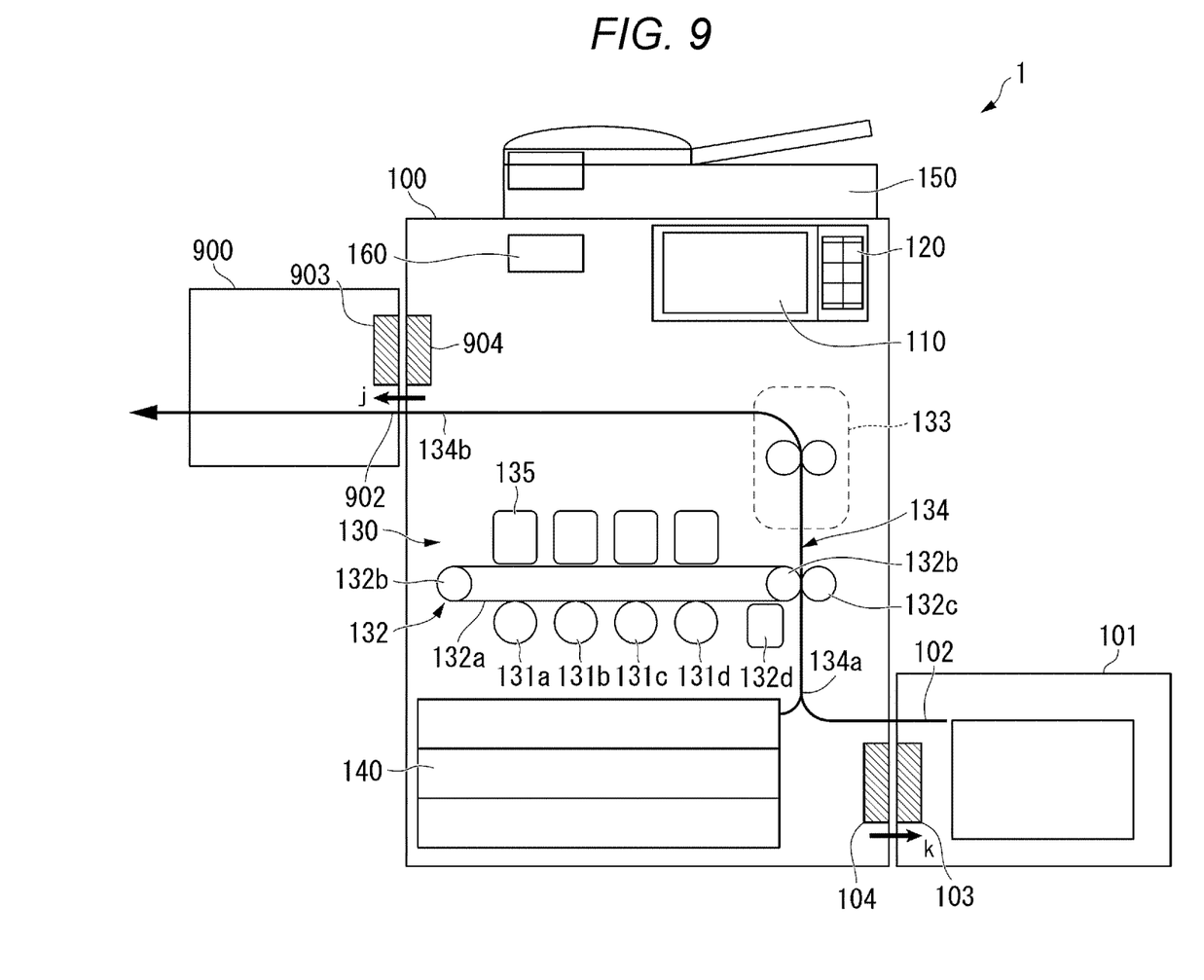
FIG. 9 is an explanatory diagram showing an example of the image forming system 1 according to a modification.

Next, a modification of the present embodiment will be described. In the following modifications, the description of the contents described in the above-described embodiment will be omitted as appropriate. In the above-described embodiment, the image forming system 1 provided with the large-capacity sheet feed device 101 as a retrofit device was described. In the modification, the image forming system 1 provided with a sheet post-processing device 900 as a retrofit device in addition to the large-capacity sheet feed device 101 will be described.

FIG. 9 is an explanatory diagram showing an example of the image forming system 1 according to the modification. In FIG. 9, the image forming system 1 is provided with the sheet post-processing device 900 in addition to the configuration shown in FIG. 1. The sheet post-processing device 900 is a device that performs post-processing on the sheet. The post-processing of the sheet is, for example, a sorting process, a stapling process, and/or a punching process. The sorting process is a process of sorting sheets into copies and discharging the copies when printing a plurality of copies. The stapling process is a process of applying staples in units of copies. The punching process is the process of punching a hole at a predetermined position on the sheet. Such a sheet post-processing device 900 may be retrofitted to the image forming apparatus 100.

The sheet post-processing device 900 is provided at the sheet discharge position in the image forming apparatus 100. A connection conveyance path 902 for conveying the sheet is formed at the connection portion between the image forming apparatus 100 and the sheet post-processing device 900. In the sheet post-processing device 900, a near field wireless tag 903 is disposed at a predetermined position on the image forming apparatus side.

A near field wireless module 904 is arranged at a predetermined position in the image forming apparatus 100. The near field wireless module 904 transmits radio waves in the direction of arrow j, for example. The near field wireless module 904 includes an antenna and communicates with the near field wireless tag 903. Specifically, the near field wireless module 904 performs handshake communication with the near field wireless tag 903 to establish communication.

The connection conveyance path 902 is formed with accurate alignment between the image forming apparatus 100 and the sheet post-processing device 900. In other words, if the connection between the image forming apparatus 100 and the sheet post-processing device 900 is misaligned, a sheet conveyance failure such as jamming occurs and the sheet cannot be efficiently conveyed. Therefore, if the communication range between the near field wireless module 904 and the near field wireless tag 903 is wider than necessary, communication will be established even though the connection with the sheet post-processing device 900 is misaligned.

Therefore, in the present embodiment, the near field wireless module 904 and the near field wireless tag 903 are disposed so that communication can be established only at a position where the near field wireless module 904 and the near field wireless tag 903 face each other (appropriate position). Therefore, for example, it is desirable that the antenna of the near field wireless module 904 be a directional antenna having good sensitivity only in a certain direction. Further, it is desirable that the communication distance be set so that the near field wireless module 904 and the near field wireless tag 903 can communicate only at the opposite positions.

Further, in the modification, the detection unit 401 detects the connection state between the sheet post-processing device 900 and the image forming apparatus based on the communication result of the near field wireless module 904. The notification unit 402 gives a notification based on the connection state with the sheet post-processing device 900 detected by the detection unit 401.

In the modification, the image forming system 1 includes the large-capacity sheet feed device 101 and the sheet post-processing device 900, but it is sufficient that at least one of the large-capacity sheet feed device 101 and the sheet post-processing device 900 is provided. That is, for example, the image forming system 1 may include only the sheet post-processing device 900 and may not include the large-capacity sheet feed device 101.

As described above, the image forming apparatus 100 according to the modification detects the connection state with the sheet post-processing device 900 based on the communication result with the near field wireless tag 903 and gives a notification based on the connection state. As a result, the user can be made to recognize whether the sheet post-processing device 900 is at the connection position or the non-connection position and can use the sheet post-processing device 900. Therefore, it is possible to prevent a sheet conveyance failure from occurring in the connection conveyance path 902. Further, since the alignment between the image forming apparatus 100 and the sheet post-processing device 900 can be easily and accurately performed, the sheet post-processing device 900 can be disposed at the connection position by using simplified sheet metal or the like instead of using a dedicated sheet metal or the like as in the related art.

While certain embodiments have been described, these embodiments have been presented by way of example only, and are not intended to be limiting. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
   a sheet conveying path formed between the image forming apparatus and a retrofit device placed at a connection position;
   a communication interface configured to communicate with a wireless tag disposed at the retrofit device;
   a detector configured to detect a connection state between the retrofit device and the image forming apparatus in the sheet conveying path based on a communication result of the communication interface; and
   a notification interface configured to provide a notification based on the connection state detected by the detector,
   wherein the wireless tag and the communication interface face each other at the connection position,
   wherein the notification interface notifies of urging a re-installation of the retrofit device to the connection position in response to the connection state indicating that a non-connection is detected by the detector for a predetermined time or longer.

2. The image forming apparatus of claim 1, wherein the notification interface notifies of a connection failure in response to the connection state indicating that a non-connection is detected by the detector.

3. The image forming apparatus of claim 2, wherein the notification interface notifies of the connection failure in response to the connection state indicating that the non-connection is detected by the detector for a predetermined time or longer.

4. The image forming apparatus of claim 1, wherein the communication interface communicates with the wireless tag by a handshake communication and handles only the information related to an establishment of the handshake communication with the near field wireless tag.

5. The image forming apparatus of claim 1, wherein a processor is configured to perform as the detector and the notification interface, and the processor is further configured to discontinue use of the retrofit device in response to the connection state indicating that a non-connection is detected by the detector.

6. The image forming apparatus of claim 5, wherein the notification interface notifies that use of the retrofit device was discontinued by the processor.

7. The image forming apparatus of claim 1, wherein the retrofit device is a sheet supply device that supplies a sheet.

8. The image forming apparatus of claim 1, wherein the retrofit device is a sheet post-processing device that performs post-processing on a sheet.

9. A detection method, which is used for an image forming apparatus provided with a communication interface that communicates with a wireless tag at a connection position where a sheet conveyance path is formed between the image forming apparatus and a retrofit device, the wireless tag disposed at the retrofit device, the method comprising:
   detecting a connection state between the retrofit device and the image forming apparatus in the sheet conveying path based on a communication result of the communication interface;
   providing a notification based on the connection state detected in the detection,
   wherein the wireless tag and the communication interface face each other at the connection position; and
   notifying of urging a re-installation of the retrofit device to the connection position in response to the connection state indicating that a non-connection is detected for a predetermined time or longer.

10. The detection method of claim 9, wherein the notification is of a connection failure in response to the connection state indicating that a non-connection is detected.

11. The detection method of claim 9, wherein the communication interface communicates with the wireless tag by a handshake communication and handles only the information related to an establishment of the handshake communication with the near field wireless tag.

12. The detection method of claim 9, further comprising discontinuing use of the retrofit device in response to the connection state indicating that a non-connection is detected.

13. The detection method of claim 9, wherein the retrofit device is a sheet supply device that supplies a sheet.

14. The detection method of claim 9, wherein the retrofit device is a sheet post-processing device that performs post-processing on a sheet.

15. An image forming system comprising an image forming apparatus and a retrofit device provided with a wireless tag, the image forming apparatus comprising:
- a sheet conveying path formed between the image forming apparatus and the retrofit device placed at a connection position;
- a communication interface configured to communicate with the wireless tag disposed at the retrofit device;
- a detector configured to detect a connection state between the retrofit device and the image forming apparatus in the sheet conveying path based on a communication result of the communication interface; and
- a notification interface configured to give a notification based on the connection state detected by the detector,
- wherein the wireless tag and the communication interface face each other at the connection position,
- wherein the notification interface notifies of urging a re-installation of the retrofit device to the connection position in response to the connection state indicating that a non-connection is detected by the detector for a predetermined time or longer.

16. The image forming system of claim 15, wherein the notification interface notifies of a connection failure in response to the connection state indicating that a non-connection is detected by the detector.

17. The image forming system of claim 15, wherein the communication interface communicates with the wireless tag by a handshake communication and handles only the information related to an establishment of the handshake communication with the near field wireless tag.

18. The image forming system of claim 15, wherein the image forming apparatus is configured to discontinue use of the retrofit device in response to the connection state indicating that a non-connection is detected by the detector.

19. The image forming system of claim 15, wherein the retrofit device is a sheet supply device that supplies a sheet.

20. The image forming system of claim 15, wherein the retrofit device is a sheet post-processing device that performs post-processing on a sheet.

* * * * *